(12) United States Patent
Tsukernik et al.

(10) Patent No.: US 9,641,441 B2
(45) Date of Patent: May 2, 2017

(54) LEARNING INFORMATION ASSOCIATED WITH SHAPING RESOURCES AND VIRTUAL MACHINES OF A CLOUD COMPUTING ENVIRONMENT

(71) Applicant: Verizon Patent and Licensing Inc., Basking Ridge, NJ (US)

(72) Inventors: Michael A. Tsukernik, Newton, MA (US); Paul M. Curtis, Sudbury, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 564 days.

(21) Appl. No.: 14/206,583

(22) Filed: Mar. 12, 2014

(65) Prior Publication Data
US 2015/0263944 A1    Sep. 17, 2015

(51) Int. Cl.
| | | |
|---|---|---|
| *H04L 12/723* | (2013.01) | |
| *H04L 12/815* | (2013.01) | |
| *H04L 12/46* | (2006.01) | |
| *H04L 29/08* | (2006.01) | |
| *H04L 12/833* | (2013.01) | |
| *H04L 12/911* | (2013.01) | |

(52) U.S. Cl.
CPC .......... *H04L 47/22* (2013.01); *H04L 12/4675* (2013.01); *H04L 47/31* (2013.01); *H04L 67/101* (2013.01); *H04L 67/1008* (2013.01); *H04L 67/1012* (2013.01); *H04L 47/829* (2013.01); *H04L 2212/00* (2013.01)

(58) Field of Classification Search
CPC .. H04L 12/4641–12/4695; H04L 47/10; H04L 47/22; H04L 47/225; H04L 47/70–47/829; H04L 2212/00; H04L 41/0896
See application file for complete search history.

(56) References Cited

U.S. PATENT DOCUMENTS

| | | | | |
|---|---|---|---|---|
| 8,160,063 B2 * | 4/2012 | Maltz | ..................... | H04L 45/02 370/254 |
| 9,258,237 B1 * | 2/2016 | Smith | ................... | H04L 47/122 |
| 9,258,742 B1 * | 2/2016 | Pianigiani | ............. | H04L 67/327 |
| 2010/0118882 A1 * | 5/2010 | Gao | ................... | H04L 12/4633 370/411 |

(Continued)

*Primary Examiner* — Farzana Huq
*Assistant Examiner* — Julian Chang

(57) ABSTRACT

A source network device of a cloud computing network receives a packet destined for a destination virtual machine provided in a destination cloud computing device. The packet is received from a source virtual machine provided in a source cloud computing device. The source network device associates, to the packet, a source shaping resource of the source network device, where the source shaping resource includes a bandwidth that matches or exceeds a bandwidth associated with the source virtual machine. The source network device adds, to the packet, a header that identifies an address of the source virtual machine, an identifier associated with the source shaping resource, and the bandwidth associated with the source virtual machine. The source network device provides, via the source shaping resource, the packet and the header to the cloud computing network for transmission to the destination virtual machine.

20 Claims, 13 Drawing Sheets

(56) References Cited

U.S. PATENT DOCUMENTS

| | | | |
|---|---|---|---|
| 2010/0214917 A1* | 8/2010 | Yang | H04L 12/5695 370/230 |
| 2011/0103223 A1* | 5/2011 | Dhillon | H04L 47/10 370/231 |
| 2012/0250505 A1* | 10/2012 | Brolin | H04L 47/17 370/230.1 |
| 2013/0223438 A1* | 8/2013 | Tripathi | H04L 45/66 370/355 |
| 2013/0235870 A1* | 9/2013 | Tripathi | H04L 45/56 370/390 |
| 2013/0339423 A1* | 12/2013 | Degtiarov | G06F 9/5072 709/203 |
| 2014/0068703 A1* | 3/2014 | Balus | H04L 41/0893 726/1 |
| 2014/0129700 A1* | 5/2014 | Mehta | H04L 43/0817 709/224 |
| 2015/0040121 A1* | 2/2015 | Barabash | G06F 9/45558 718/1 |
| 2015/0081863 A1* | 3/2015 | Garg | H04L 41/00 709/223 |
| 2015/0092551 A1* | 4/2015 | Moisand | H04L 12/4633 370/235 |
| 2015/0131653 A1* | 5/2015 | Zaifman | H04L 63/306 370/389 |
| 2015/0180773 A1* | 6/2015 | DeCusatis | H04L 12/4641 370/392 |
| 2015/0188780 A1* | 7/2015 | Spieser | H04L 41/5009 370/252 |
| 2015/0195178 A1* | 7/2015 | Bhattacharya | H04L 45/745 718/1 |
| 2015/0222557 A1* | 8/2015 | Bhattacharya | H04L 47/32 370/237 |
| 2015/0256462 A1* | 9/2015 | Tripathi | H04L 47/11 370/236 |
| 2016/0014048 A1* | 1/2016 | Tripathi | H04L 49/1507 370/359 |
| 2016/0028654 A1* | 1/2016 | Tripathi | H04L 49/254 370/355 |
| 2016/0134547 A1* | 5/2016 | Chen | H04L 12/4641 370/235 |
| 2016/0241491 A1* | 8/2016 | Tripathi | H04L 49/1523 |
| 2016/0277291 A1* | 9/2016 | Lakshmikanthan | H04L 45/507 |

\* cited by examiner

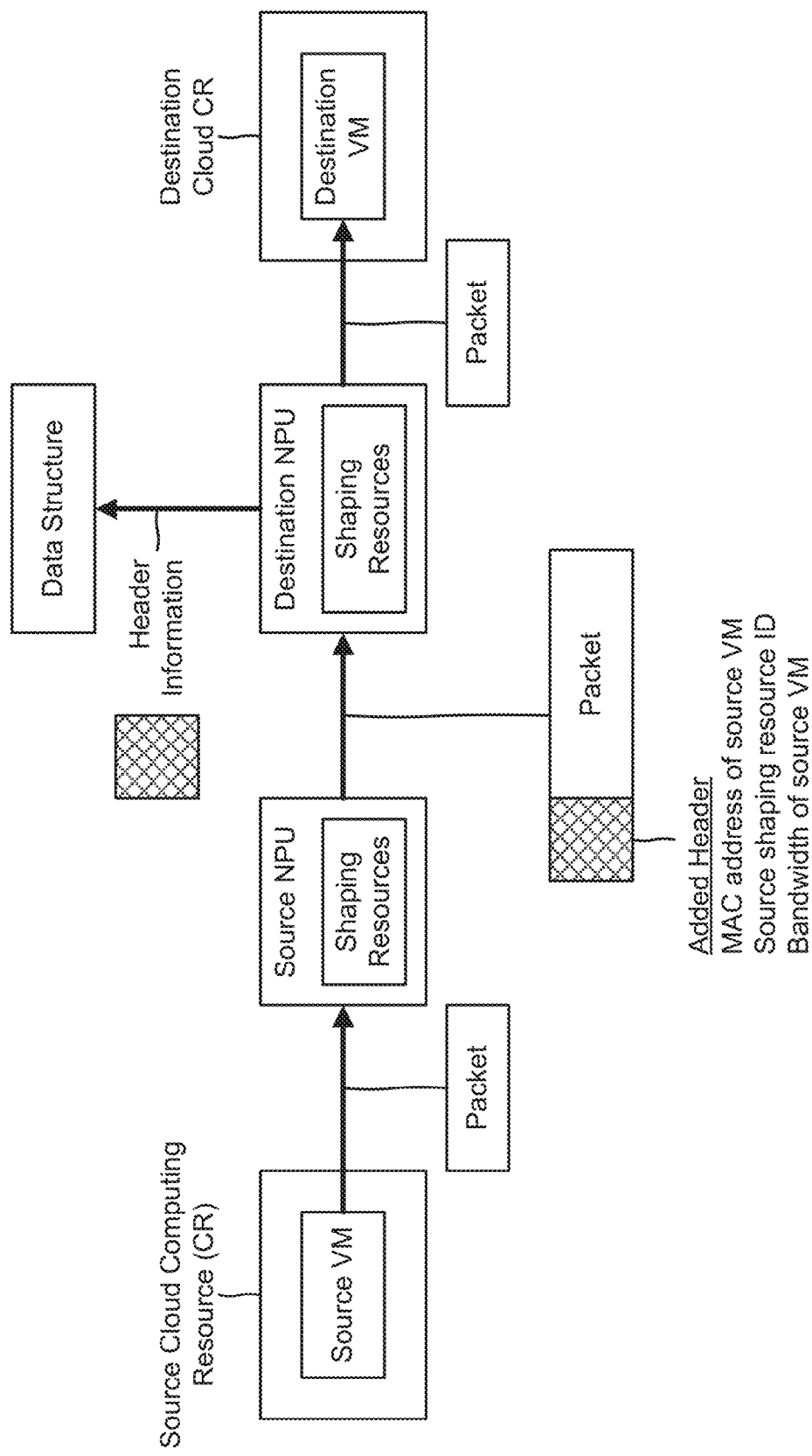

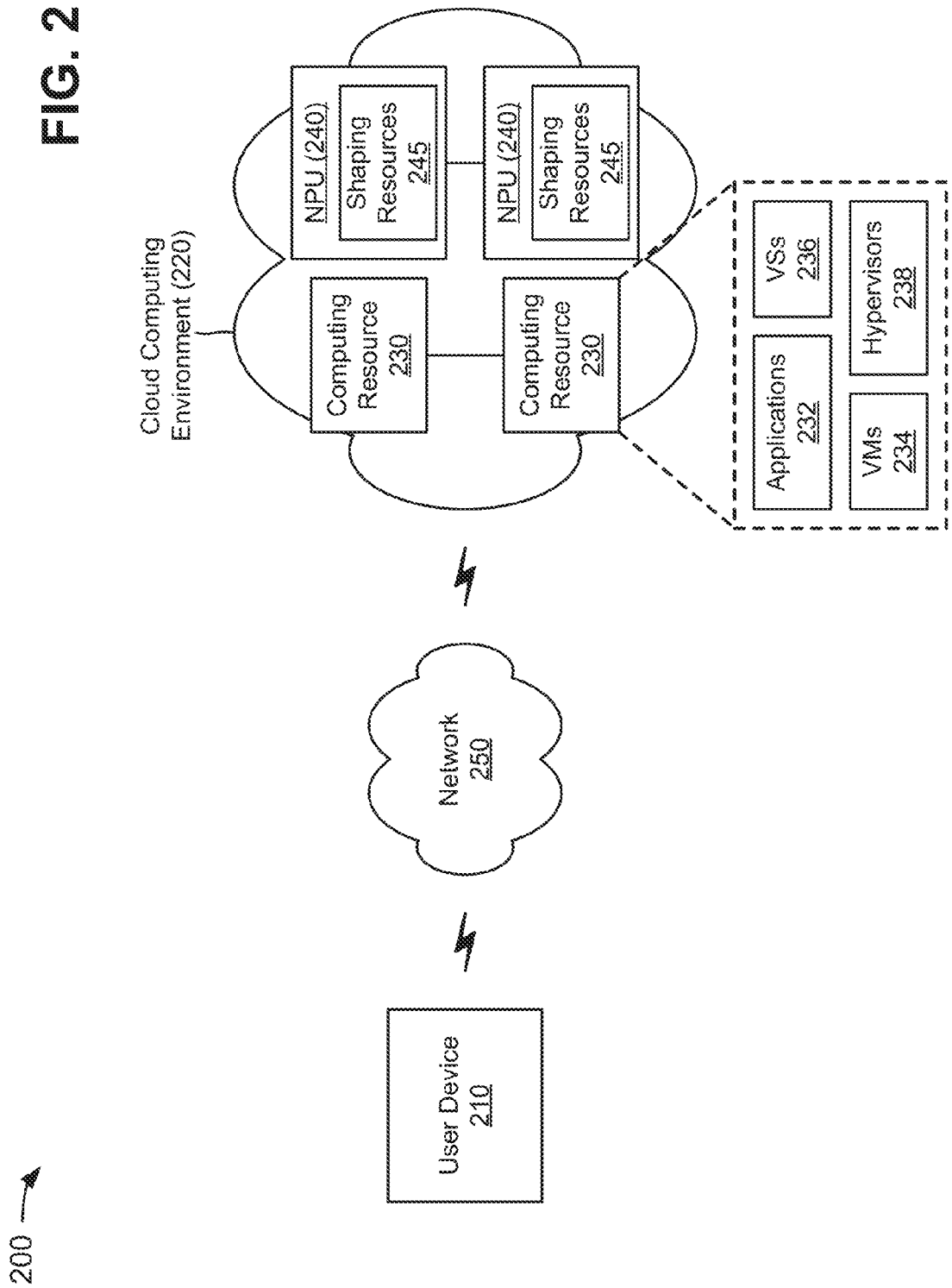

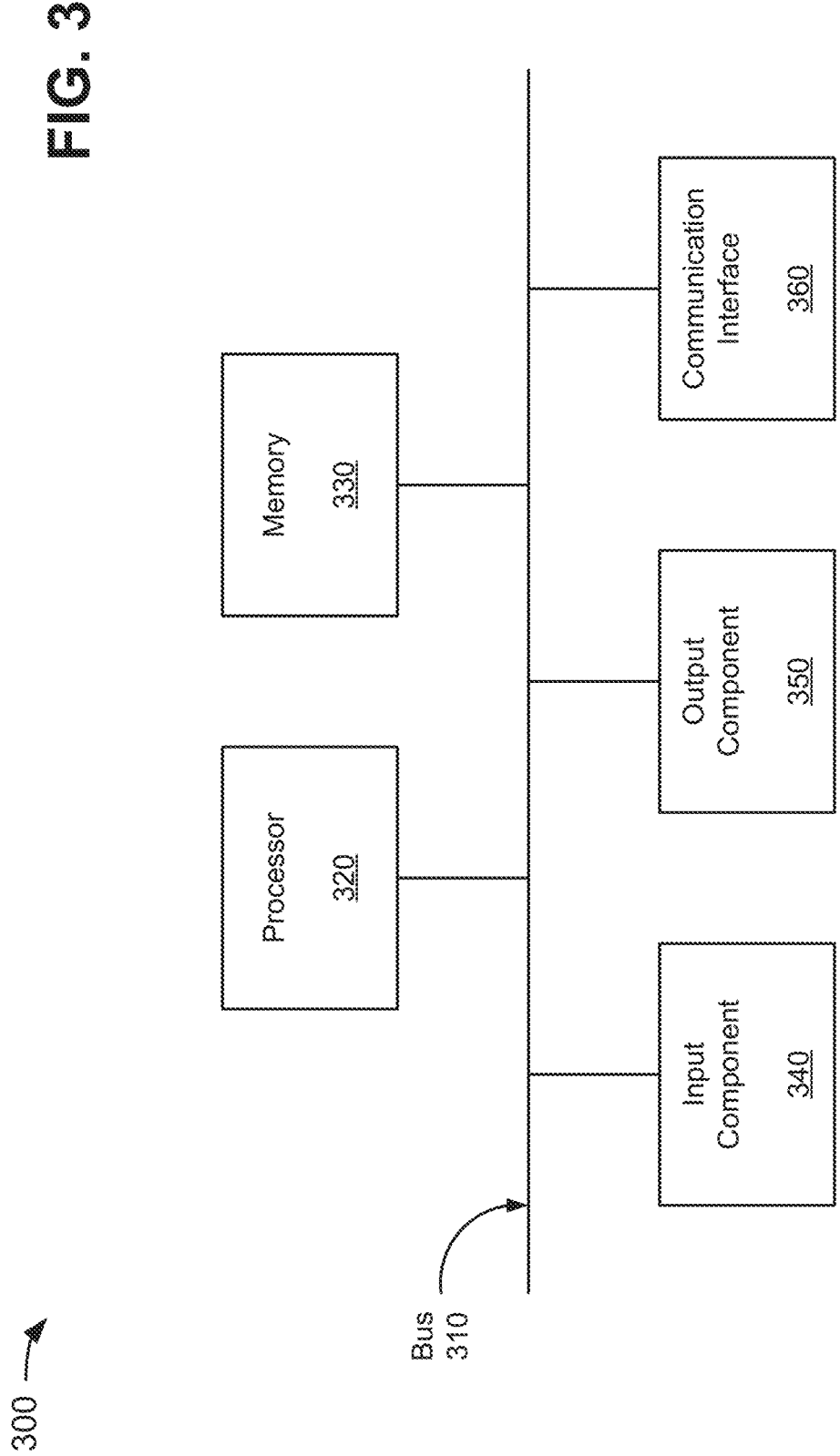

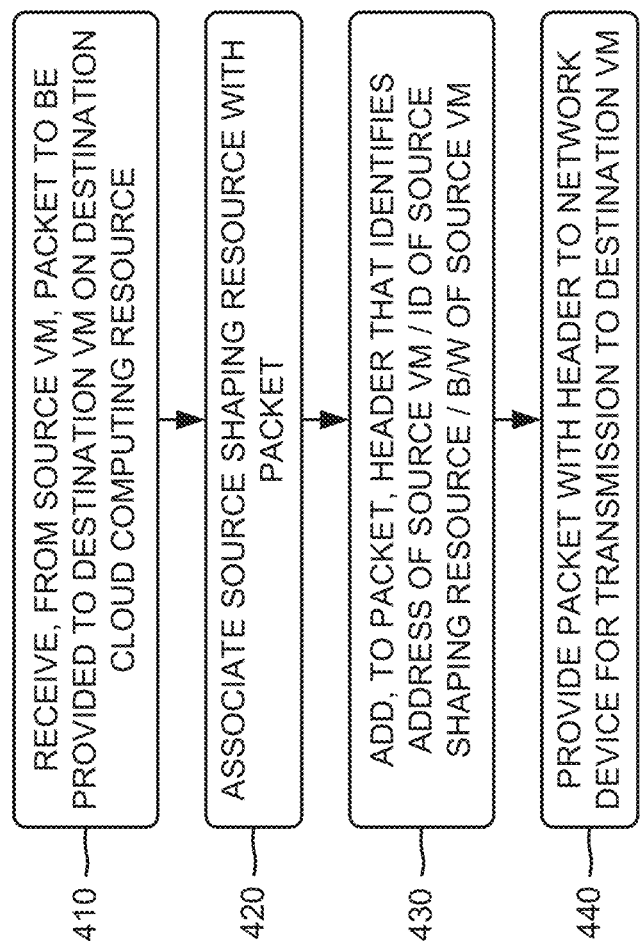

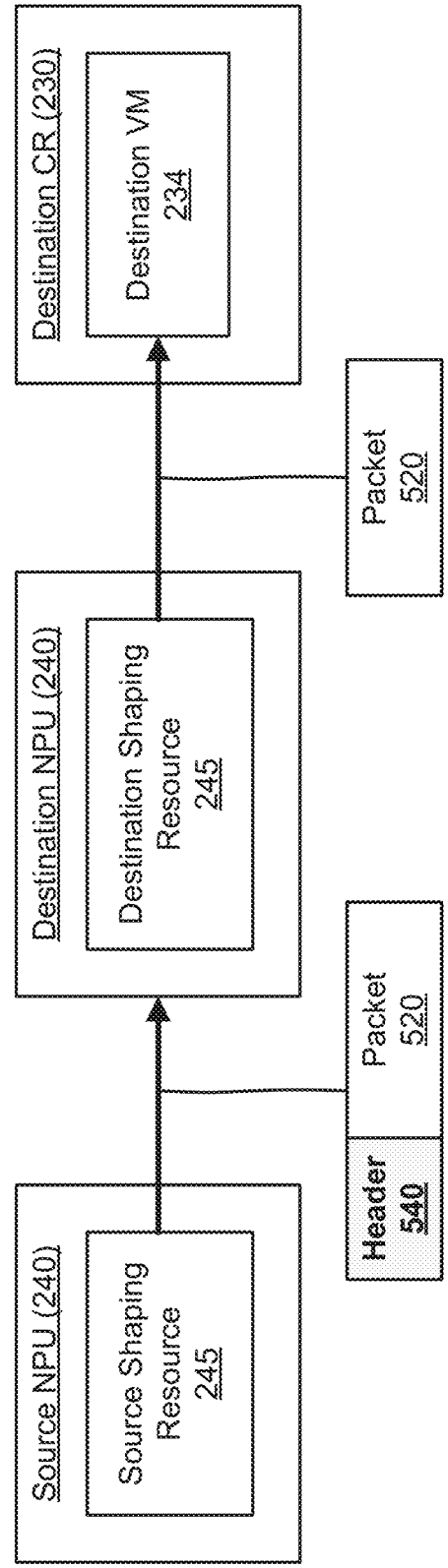

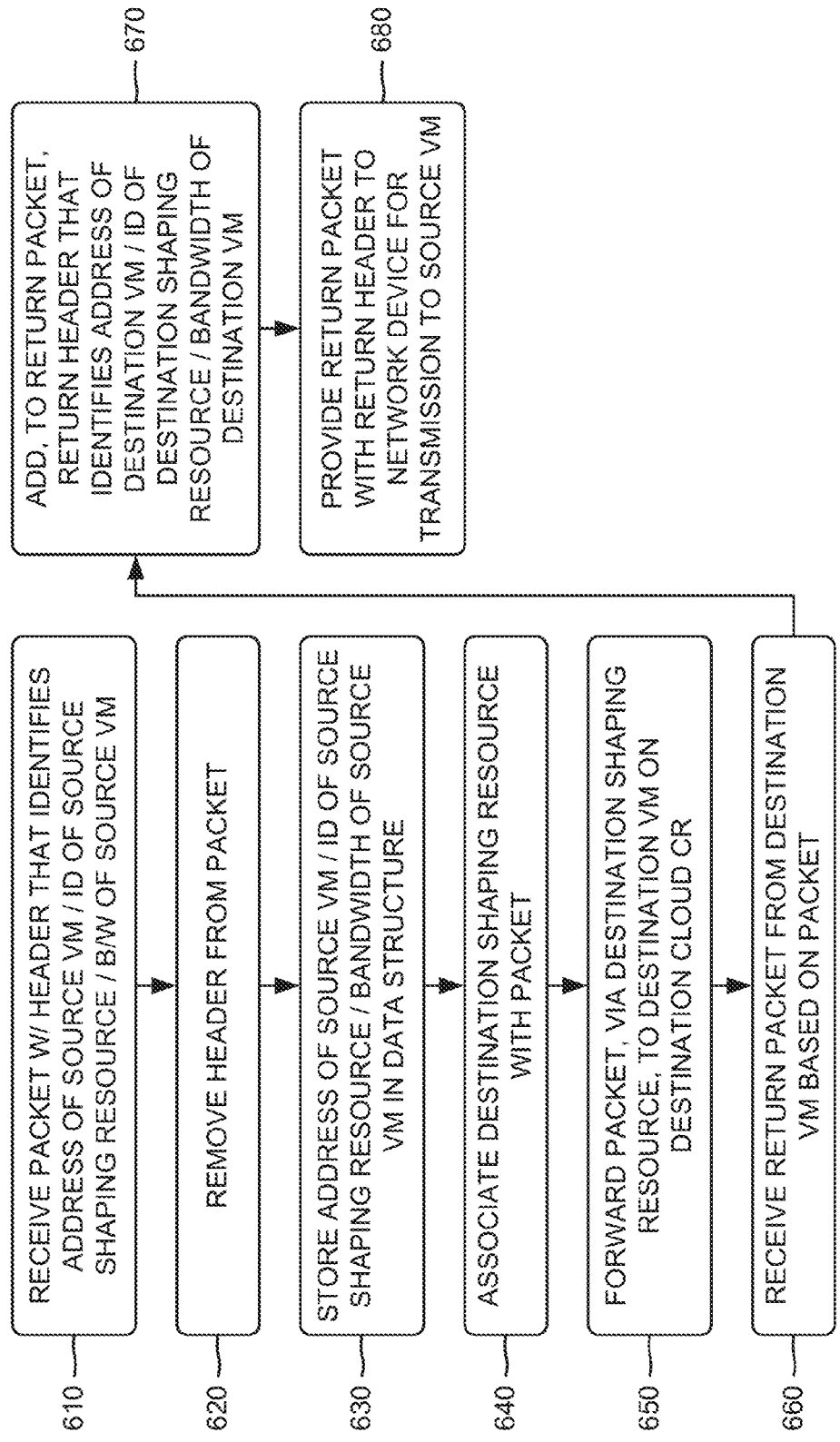

LEARNING INFORMATION ASSOCIATED WITH SHAPING RESOURCES AND VIRTUAL MACHINES OF A CLOUD COMPUTING ENVIRONMENT

BACKGROUND

Cloud computing is the use of computing resources (e.g., hardware, software, storage, computing power, etc.) which are available from a remote location and accessible over a network, such as the Internet. Cloud computing environments deliver the computing resources as a service rather than as a product, whereby shared computing resources are provided to user devices (e.g., computers, smart phones, etc.). Users may buy these computing resources and use the computing resources on an on-demand basis. Cloud computing environments provide services that do not require end-user knowledge of a physical location and configuration of a system that delivers the services. The computing resources may include virtual machines (VMs) that provide software implementations of a physical machine and execute programs like a physical machine. The VMs may provide cloud computing services to the users.

BRIEF DESCRIPTION OF THE DRAWINGS

FIGS. 1A and 1B are diagrams of an overview of an example implementation described herein;

FIG. 2 is a diagram of an example environment in which systems and/or methods described herein may be implemented;

FIG. 3 is a diagram of example components of a device that may correspond to one or more of the devices of the environment depicted in FIG. 2;

FIG. 4 is a flow chart of an example process for adding a header, to a packet, that informs a destination network processing unit (NPU) about source shaping resource information and source VM information;

FIGS. 5A-5C are diagrams of an example relating to the example process shown in FIG. 4;

FIG. 6 is a flow chart of an example process for receiving a packet header at informs a destination NPU about source shaping resource information and source VM information.

DETAILED DESCRIPTION OF PREFERRED EMBODIMENTS

The following detailed description refers to the accompanying drawings. The same reference numbers in different drawings may identify the same or similar elements.

Cloud computing environments may include network devices, such as network processing units (NPUs) or network processors, which enable computing resources, of the cloud computing environment, to communicate with each other. The NPUs may include shaping resources that provide traffic or packet shaping in order to regulate data transfer (e.g., among the computing resources) with a particular level of performance, quality of service (QoS), etc.

Each of the shaping resources may transfer data (e.g., sequences of network packets) at a particular transfer speed, data transfer rate, or bandwidth (e.g., in megabits per second (Mbps), gigabits per second (Gbps), etc.). When a packet arrives at a source NPU, the source NPU may associate a source shaping resource with the packet that matches a bandwidth requested by the packet. The source shaping resource may transmit the packet to a destination NPU according to the bandwidth. The source NPU may be unaware of bandwidths associated with destination shaping resources provided in the destination NPU. Furthermore, for QoS and rate control, packets destined for the same destination, and transmitted in close time proximity, may need to be serviced by the same shaping resource.

Figure 1B:
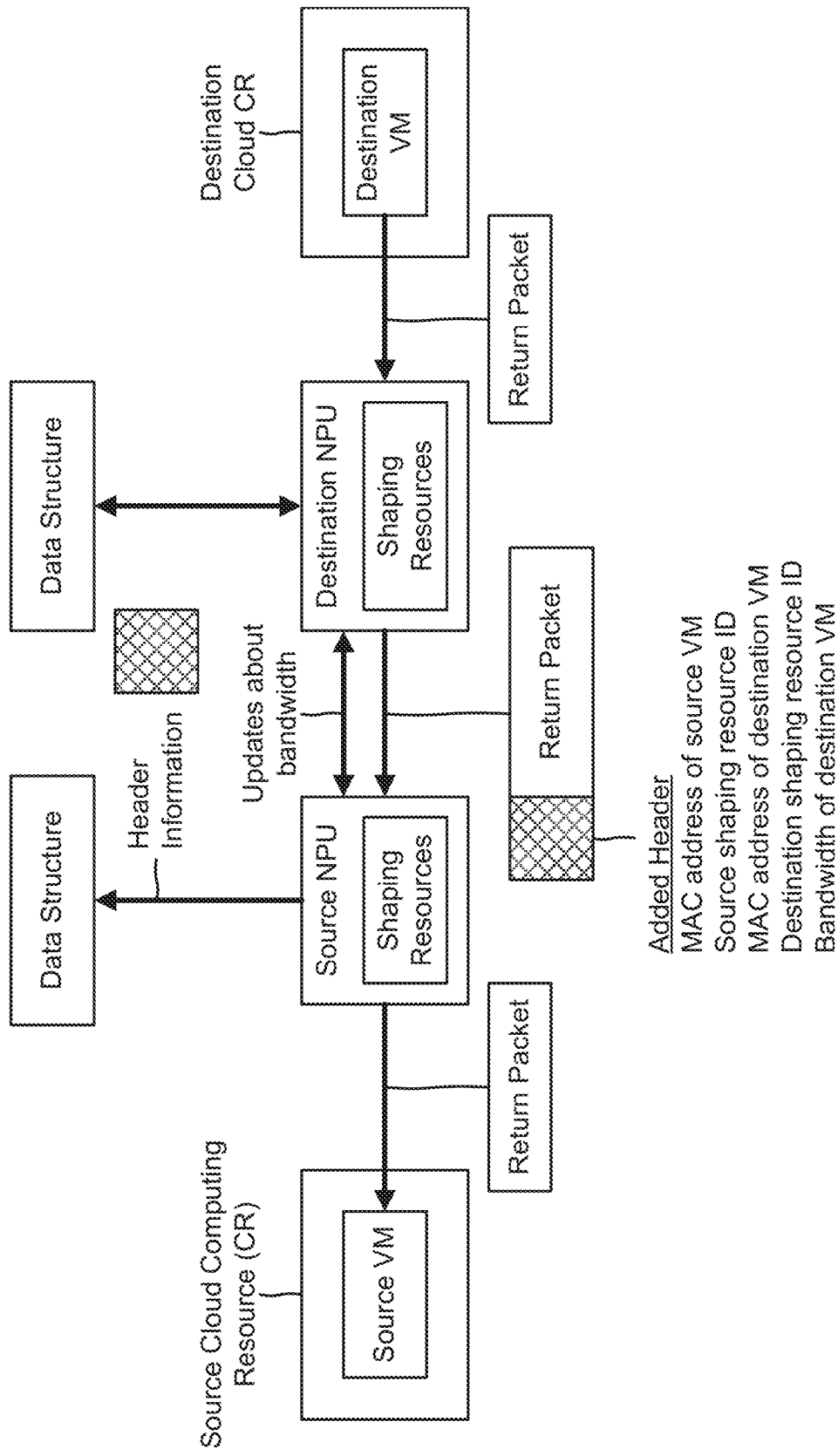

FIGS. 1A and 1B are diagrams of an overview of an example implementation 100 described herein. In example implementation 100, assume that a cloud computing environment includes multiple cloud computing resources (CRs) connected by multiple network devices, such as NPUs. As shown in FIG. 1A, a source cloud computing resource may be associated with a source NPU. The source cloud computing resource may include a source virtual machine (VM) to which a user of the cloud computing environment may provide information (e.g., a packet) and/or may cause to generate a packet to be transmitted according to a particular bandwidth. A destination cloud computing resource may be associated with a destination NPU, and may include a destination VM.

As further shown in FIG. 1A, the source NPU and the destination NPU may each include multiple shaping resources. The source NPU may receive the packet from the source VM, and may associate, to the packet, a source shaping resource with a bandwidth that matches or exceeds the particular bandwidth associated with the packet. The source NPU may add a header to the packet (e.g., may encapsulate the packet with the header). The header may identify an address (e.g., a media access control (MAC) address) of the source VM, an identifier (ID) of the source shaping resource, a bandwidth of the source VM, and/or other information (e.g., a MAC address of the destination cloud computing resource, a virtual local network (VLAN) identifier of the source VM, and/or a VLAN identifier of the destination VM).

As shown in FIG. 1A, the source NPU may forward the packet, with the header, to the destination NPU. The destination NPU may strip the header from the packet. The destination NPU may store header information in a data structure (e.g., a table, a database, etc.) so that the destination NPU may learn information about the source VM and the source shaping resource. The destination NPU may utilize the header information to associate, to the packet, a destination shaping resource with a bandwidth that matches or exceeds the particular bandwidth associated with the packet. The destination shaping resource may utilize the header information to provide the packet to the destination VM. For example, the destination shaping resource may utilize the VLAN identifier of the destination VM in order to provide the packet to the destination VM. The destination VM may receive the packet, and may process the packet based on information provided in or requested by the packet.

As shown in FIG. 1B, the destination VM may generate a return packet, in response to the packet, and may provide the return packet to the destination NPU. The destination NPU may communicate with the data structure in order to obtain information to aid in the transmission of the return packet. For example, the destination NPU may learn the MAC address of the source VM and the source shaping resource ID from the data structure. The destination NPU may also learn a bandwidth of the source VM based on exchanging updates about current bandwidths (e.g., of VMs) with the source NPU. The destination NPU may utilize the learned information to associate, to the return packet, the same destination shaping resource that handled the packet, and to add a header to the return packet. The header may identify the MAC address of the source VM, the source shaping resource ID, an address (e.g., a MAC address) of the destination VM, an ID of the destination shaping resource, a bandwidth of the destination VM, and/or other information (e.g., a MAC address of the source cloud computing resource, a VLAN identifier of the destination VM, and/or a VLAN identifier of the source VM).

As further shown in FIG. 1B, the destination NPU may forward the return packet, with the header, to the source NPU. The source NPU may strip the header from the return packet. The source NPU may store header information in another data structure so that the source NPU may learn information about the destination VM and the destination shaping resource. The source NPU may utilize the header information (e.g., the source shaping resource ID) to associate, to the return packet, the same source shaping resource that handled the packet. The source shaping resource may utilize the header information to provide the return packet to the source VM. For example, the source shaping resource may utilize the VLAN identifier of the source VM in order to provide the return packet to the source VM. The source VM may receive the return packet, and may process the return packet based on information provided in or requested by the return packet.

Systems and/or methods described herein may enable a source NPU to add, to a packet, a header that identifies an identifier a source shaping resource that transmits the packet and/or information (e.g., an address and a bandwidth) associated with a source virtual machine that generates the packet. The systems and/or methods may enable a destination NPU to learn the bandwidth of the source virtual machine, which may prevent the destination NPU from overloading the source virtual machine with traffic. In some implementations, the systems and/or methods may enable a destination NPU to learn bandwidths associated with source virtual machines and may enable a source NPU to learn bandwidths associated with destination virtual machines. This may prevent the source NPU from overloading the destination virtual machines, and may prevent the destination NPU from overloading the source virtual machines.

FIG. 2 is a diagram of an example environment 200 in which systems and/or methods described herein may be implemented. As illustrated, environment 200 may include a user device 210 interconnected with a cloud computing environment 220 via a network 250. Devices/networks of environment 200 may interconnect via wired connections, wireless connections, or a combination of wired and wireless connections.

User device 210 may include a device that is capable of communicating over network 250 with cloud computing environment 220 and/or one or more devices of cloud computing environment 220. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; a personal computer; a landline telephone; a gaming device; or another type of computation and communication device.

Cloud computing environment 220 may include an environment that delivers computing as a service, whereby shared resources, services, etc. may be provided to user device 210. Cloud computing environment 220 may provide computation, software, data access, storage, etc. services that do not require end-user (e.g., user device 210) knowledge of a physical location and configuration of system(s) and/or device(s) that deliver the services.

As shown, cloud computing environment 220 may include a group of computing resources 230 (referred to collectively as "computing resources 230" and individually as "computing resource 230"), and a group of NPUs 240 (referred to collectively as "NPUs 240" and individually as "NPU 240").

Computing resource 230 may induct one or more personal computers, workstation computers, server devices, or other types of computation and communication devices. In some implementations, computing resource 230 may provide cloud resources to user device 210. The cloud resources may include compute instances executing in computing resource 230, storage devices provided in computing resource 230, data transfer operations executed by computing resource 230, etc. In some implementations, computing resource 230 may communicate with other computing resources 230 via wired connections, wireless connections, or a combination of wired and wireless connections.

As further shown in FIG. 2, computing resource 230 may include one or more applications 232, one or more virtual machines (VMs) 234, virtualized storage (VSs) 236, one or more hypervisors 238, etc.

Application 232 may include one or more software applications that may be provided to or accessed by user device 210. Application 232 may eliminate a need to install and execute the software applications on user device 210. For example, application 232 may include word processing software, database software, monitoring software, financial software, communication software, and/or any other software capable of being provided via cloud computing environment 220. In some implementations, one application 232 may send/receive information to/from one or more other applications 232, via virtual machine 234.

Virtual machine 234 may include a software implementation of a physical machine (e.g., a computer) that executes programs like a physical machine. Virtual machine 234 may be either a system virtual machine or a process virtual machine, depending upon use and degree of correspondence to any real machine by virtual machine 234. A system virtual machine may provide a complete system platform that supports execution of a complete operating system (OS). A process virtual machine may execute a single program, and may support a single process. In some implementations, virtual machine 234 may execute on behalf of a user (e.g., user device 210), and may manage infrastructure of loud computing environment 220, such as data management, synchronization, and long-duration data transfers.

Virtualized storage 236 may include one or more storage systems and/or one or more devices that use virtualization techniques to enable functionality and advanced features within the storage systems or devices of computing resource 230. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how they storage is managed for end users. File virtualization may eliminate dependencies between data accessed at a file level and a location where files are physically stored. This may enable optimization of storage use, server consolidation, and/or performance of non-disruptive file migrations.

Hypervisor 238 may provide hardware virtualization techniques that allow multiple operating systems (e.g., "guest operating systems") to execute concurrently on a host computer, such as computing resource 230. Hypervisor 238 may present a virtual operating platform to the guest operating systems, and may manage the execution of the guest operating systems. Multiple instances of a variety of operating systems may share virtualized hardware resources. Hypervisor 238 may provide an interface to infrastructure as a service (IaaS) provided by cloud computing environment 220.

NPU 240 may include a traffic transfer device, such as a gateway, a router, a switch, a firewall, a network interface card (NIC), a hub, a bridge, a proxy server, an optical add-drop multiplexer (OADM), or some other type of device that processes and/or transfers traffic (e.g., packets). In some implementations, NPU 240 may include an integrated circuit that processes and transfers packets among computing resources 230. In some implementations, NPU 240 may provide quality of service (QoS) enforcement by identifying different classes of packets and providing preferential treatment for some classes of packets over other classes of packets.

As further shown in FIG. 2, NPU 240 may include a pool of shaping resources 245. Shaping resource 245 may include hardware and/or software that provides traffic or packet shaping in order to regulate data transfer (e.g., among computing resources 230) with a particular level of performance, quality of service (QoS), transmission priority etc. In some implementations, shaping resource 245 may transfer traffic (e.g., packets) at a particular transfer speed, bandwidth, or data transfer rate (e.g., in Mbps, Gbps, etc.). In some implementations, shaping resources 245 may inform NPU 240 of being congested (e.g., when an input arrival rate of data desired for transmission consistently exceeds a desired data emission bandwidth of shaping resource 245). In some implementations, shaping resources 245 may adjust the data transfer rates, associated with shaping resources 245, based on a control input (e.g., a numeric congestion ratio) indicating a degree of downstream congestion. In some implementations, shaping resources 245 may enable active or passive queue congestion control based on a value (e.g., a queue length) or on derived properties. Active queue congestion control may discard a packet deemed offensive. Passive queue congestion control may return (e.g., to NPU 240) an indication of congestion, and NPU 240 may determine whether to drop a packet, mark a packet with a priority etc.

In some implementations, when a packet arrives at NPU 240, NPU 240 may associate, with the packet, a particular shaping resource 245 with a bandwidth that matches or exceeds a bandwidth requested by the packet. In some implementations, NPU 240 may utilize a database (e.g., a ternary content-addressable memory (TCAM)) that includes information (e.g., bandwidth information, VLAN identifiers, MAC addresses, etc.) to determine the particular shaping resource 245 to associate with the packet.

Network 250 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for adding a header, to a packet, that informs a destination NPU about source shaping resource information and source VM information. In some implementations, process 400 may be preformed by a source NPU 240. In some implementations, process 400 may be performed by another device or a group of devices separate from or including the source NPU 240.

As shown in FIG. 4, process 400 may include receiving, from a source virtual machine (VM), a packet to be provided to a destination VM on a destination cloud computing resource (block 410). For example, a user associated with user device 210 may utilize a particular virtual machine 234 of a particular computing resource 230. The particular virtual machine 234 may be referred to as a source virtual machine 234, and the particular computing resource 230 may be referred to as a source computing resource 230. In some implementations, user device 210 may access software, services, storage, etc. provided by the source virtual machine 234. User device 210 may provide a packet to the source virtual machine 234 or may cause the source virtual machine 234 to generate a packet based on the interactions between user device 210 and the source virtual machine 234. In some implementations, the source virtual machine 234 may include a source virtual network interface controller (NIC).

Assume that the packet is destined for a destination virtual machine 234 provided on a destination computing resource 230. For example, the source virtual machine 234 may need a service, information, etc., provided by the destination virtual machine 234, in order to appropriately serve user device 210. In some implementations, the destination virtual machine 234 may include a destination virtual NIC. The source virtual machine 234 may utilize the packet to receive the service, information, etc. provided by the destination virtual machine 234. In some implementations, the source computing resource 230 may provide the packet from the source virtual machine 234 to a particular NPU 240 referred to as a source NPU 240. The source NPU 240 may receive the packet.

As further shown in FIG. 4, process 400 may include associating a source shaping resource with the packet (block 420). For example, the source NPU 240 may associate one of shaping resources 245, referred to as a source shaping resource 245, with the packet. In some implementations, the packet may include information identifying a particular bandwidth (e.g., in Mbps, Gbps, etc.) at which to transmit the packet. In some implementations, when a packet arrives at the source NPU 240, the source NPU 240 may determine the particular bandwidth associated with the packet, and may associate the source shaping resource 245 with the packet based on the particular bandwidth. The source shaping resource 245 may include a bandwidth that matches or exceeds the particular bandwidth associated with the packet.

In some implementations, if the packet is not associated with a particular bandwidth, the source NPU 240 may determine a bandwidth associated with the source virtual machine 234 based on information provided in previously-received packets. In such implementations, the source NPU 240 may associate the source shaping resource 245 with the packet based on the bandwidth associated with the source virtual machine 234. For example, the source shaping resource 245 may include a bandwidth that matches or exceeds the bandwidth associated with the source virtual machine 234.

In some implementations, if the packet is not associated with a particular bandwidth, the source NPU 240 may associate, to the packet, an available shaping resource 245 as the source shaping resource 245. In such implementations, the source NPU 240 may analyze the packet to determine whether the packet is associated with a particular quality of service (QS), and may associate the source shaping resource 245 based on the particular QoS. For example, if the packet is identified as being urgent (e.g., takes precedence over other packets), the source NPU 240 may associate, to the packet, a source shaping resource 245 with a bandwidth that is greater than other shaping resources 245 of the source NPU 240.

As further shown in FIG. 4, process 400 may include adding, to the packet, a header that identifies an address of the source VM, an identifier (ID) of the source shaping resource, and a bandwidth of the source VM (block 430). For example, the source NPU 240 may add a header to the packet (also referred to as encapsulating the packet with the header). In some implementations, the header may identify an address (e.g., a MAC address) associated with the source virtual machine 234, an identifier associated with the source shaping resource 245, a bandwidth associated with the source virtual machine 234, and/or other information (e.g., a MAC address associated with the destination computing resource 230, a VLAN identifier associated with the source virtual machine 234, a VLAN identifier associated with the destination virtual machine 234, an identifier of the source NPU 240, etc.). In some implementations, the information included in the header may be utilized by a destination NPU 240 to associate a destination shaping resource 245 with the packet, and to learn about the bandwidth associated with the source virtual machine 234.

In some implementations, a portion of the information included in the header may be provided by information contained in the packet. For example, if the packet includes the address associated with the destination computing resource 230, the header may identify a pointer that points to address in the packet. Utilizing some information from the packet in the header may reduce overhead in the packet and the header, which nay help prevent congestion in network devices of cloud computing environment 220.

In some implementations, the source NPU 240 may be aware of the destination NPU 240 and the destination virtual machine 234 for the packet. In such implementations, the source NPU 240 may be aware of the destination shaping resource 245, which may include a destination shaping resource 245 previously allocated by the destination NPU 240. The source NPU 240 may utilize the destination shaping resource 245 to regulate rate and transmission priority of data provided to cloud computing environment 220. In some implementations, the source NPU 240 may be unaware of the destination NPU 240 and the destination virtual machine 234 for the packet. In such implementations, the source NPU 240 may be unaware of the destination shaping resource 245. The source NPU 240 may utilize the bandwidth of the source virtual machine 234, a broadcasting bandwidth, or another measure (e.g., hardware capacity) to regulate rate and transmission priority of data provided to cloud computing environment 220.

As further shown in FIG. 4, process 400 may include providing the packet, with the header, to a network device for transmission to the destination VM (block 440). For example, the source NPU 240 (e.g., via the source shaping resource 245) may provide the packet, with the added header, to a network device of cloud computing environment 220, such as a destination NPU 240. The destination NPU 240 may remove or strip the header from the packet, and may store the information of the header in a data structure. The destination NPU 240 may associate, with the packet, a destination shaping resource 245 that includes a bandwidth that matches or exceeds the bandwidth of the source virtual machine 234 (e.g., provided in the header). In some implementations, the destination NPU 240 may configure the bandwidth of the destination shaping resource 245 to match or exceed the bandwidth of the source virtual machine 234.

In some implementations, the destination NPU 240 may utilize the address associated with the destination computing resource 230 to forward the packet through cloud computing environment 220. For example, if the destination NPU 240 is connected to the destination computing resource 230, the destination NPU 240 (e.g., via the destination shaping resource 245) may utilize the address to forward the packet to the destination computing resource 230. If the destination NPU 240 is not connected to the destination computing resource 230, the destination NPU 240 may utilize the address to forward the packet to a next hop network device (e.g., closer to the destination computing resource 230). The destination computing resource 230 may receive the packet, and may provide the packet to the destination virtual machine 234.

In some implementations, if the packet header does not include the MAC address of the destination computing resource 230 and the VLAN identifier of the destination virtual machine 234 (e.g., when the packet header includes a broadcast address), the destination NPU 240 may provide the packet to an available destination computing resource 230 with an available destination virtual machine 234. In such implementations, the destination NPU 240 may utilize the destination shaping resource 245 to provide the packet to the available destination computing resource 230, and the available computing resource 230 may provide the packet to the available destination virtual machine 234.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
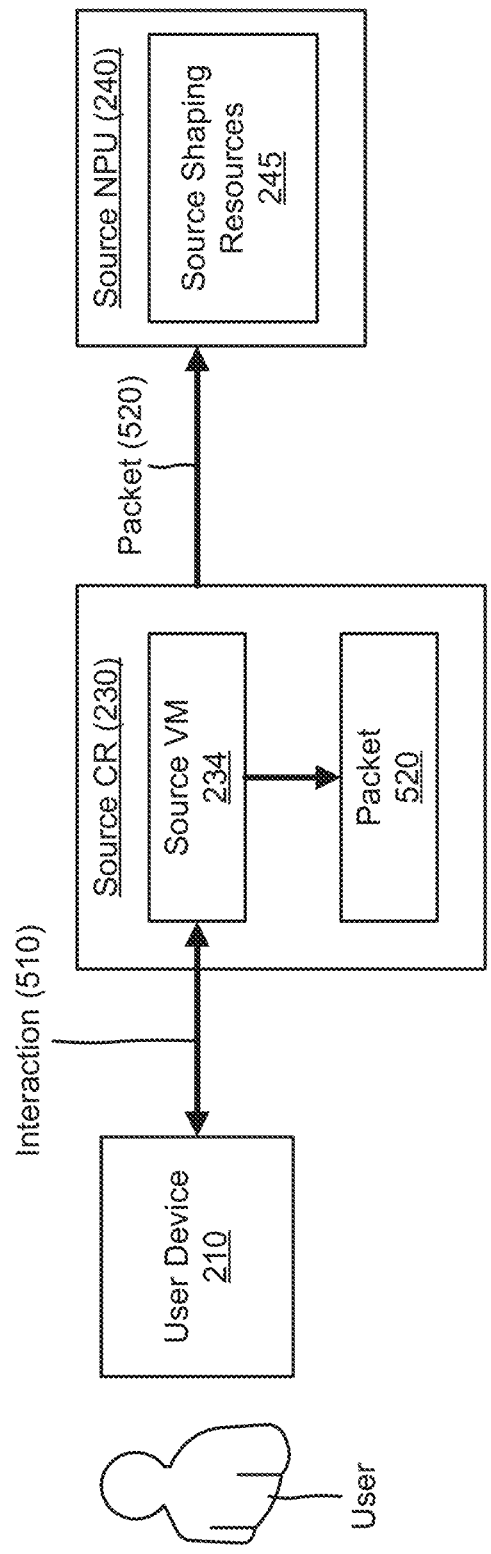
Figure 5B:
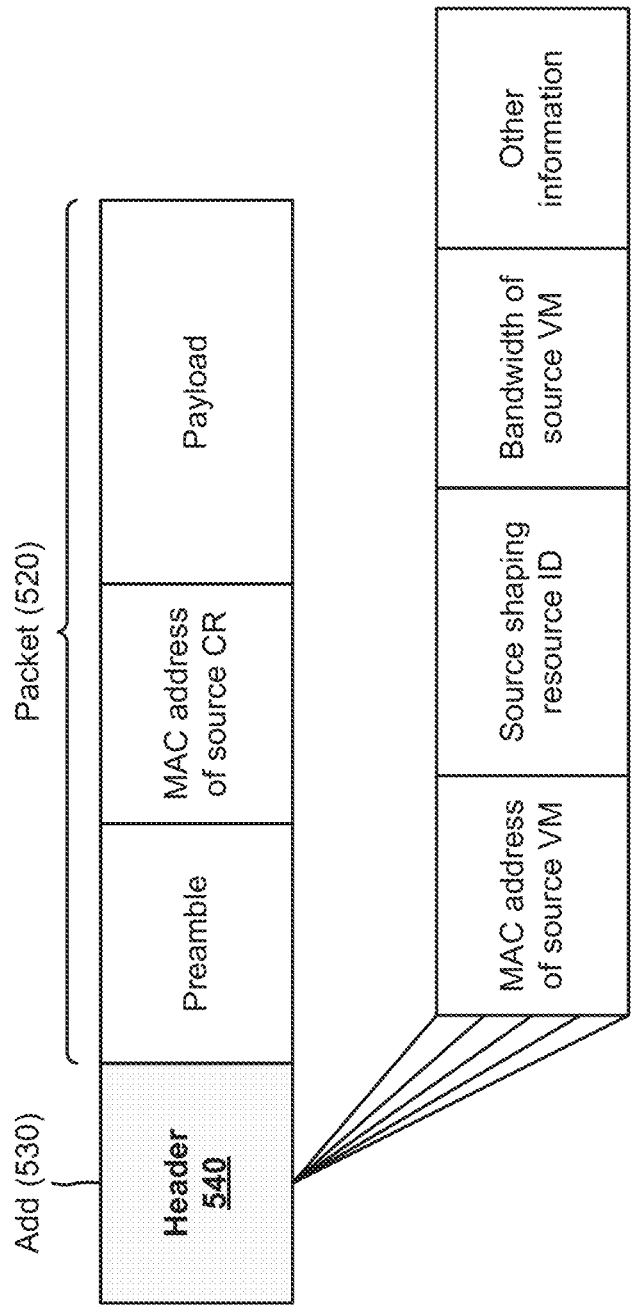

FIGS. 5A-5C are diagrams of an example 500 relating to example process 400 shown in FIG. 4. In example 500, assume that a user, associated with user device 210, subscribes to service(s), resource(s), etc. provided by cloud computing environment 220. For example, the user may utilize service(s), resource(s), etc. provided by a source virtual machine (VM) 234 of a source computing resource (CR) 230. As shown in FIG. 5A, user device 210 may interact with the source virtual machine 234, as indicated by reference number 510. Interaction 510 of user device 210 and the source virtual machine 234 may result in a packet 520 being provided to the source computing resource 230. For example, user device 210 may provide packet 520 to the source computing resource 230 via the source virtual machine 234, or may cause the source virtual machine 234 to generate packet 520.

Packet 520 may include a frame, a datagram, a packet, or a cell; a fragment of a frame, a fragment of a datagram, a fragment of a packet, or a fragment of a cell; or another type, arrangement, or packaging of data. In some implementations, packet 520 may include an Internet protocol (IP) over Ethernet frame. Further, assume that packet 520 is destined for a destination virtual machine 234 of a destination computing resource 230, and that the source computing resource 230 provides packet 520 to a source NPU 240, as further shown in FIG. 5A. Packet 520 may include information that instructs the source NPU 240 to forward packet 520 to the destination virtual machine 234. The source NPU 240 may associate a source shaping resource 245 for transmitting packet 520 based on a bandwidth associated with packet 520 and/or the source virtual machine 234. For example, if packet 520 requests a bandwidth of 10 Mbps, the source NPU 240 may associate a source shaping resource 245 with a bandwidth of 10 Mbps or greater.

As shown in FIG. 5B, packet 520 may include a variety of fields, such as, for example, a preamble, a MAC address of the source CR, a payload, etc. The preamble may include a synchronization pattern that is used to establish synchronization. After synchronization is established, the preamble may be used to locate a first bit of packet 520. The MAC address of the source CR may include a MAC address of the source computing resource 230. The payload may include user data to be delivered to the destination virtual machine 234.

As further shown in FIG. 5B, the source NPU 240 may add, as indicated by reference number 530, a header 540 to packet 520. Header 540 may include a variety of fields, such as, for example, a MAC address of the source VM field, a source shaping resource ID field, a bandwidth of the source VM field, and/or other information (e.g., a MAC address of the source CR, a VLAN ID of the source VM, a VLAN ID of the destination VM, etc.). The MAC address of the source VM field may include a MAC address of the source virtual machine 234. The source shaping resource ID field may include an identifier (e.g., a numeric identifier, an alphabetical identifier, an alphanumeric identifier, etc.) associated with the source shaping resource 245. The bandwidth of the source VM field may include a bandwidth (e.g., in Mbps, Gbps, etc.) associated with the source virtual machine 234. The MAC address of the source CR may include a MAC address of the source computing resource 230. In some implementations, this field may include a pointer to the MAC address of the source CR provided in packet 520. The VLAN ID of the source VM may include a VLAN identifier or tag associated with the source virtual machine 234. The VLAN ID of the destination VM may include a VLAN identifier or tag associated with the destination virtual machine 234.

As shown in FIG. 5C, the source shaping resource 245 of the source NPU 240 may provide packet 520 and header 540 to a destination NPU 240 provided in cloud computing environment 220. The destination NPU 240 may strip header 540 from packet 520, and may store information from header 540 in a data structure (e.g., a table, a database, etc.) so that the destination NPU 240 may learn information about the source virtual machine 234 and the source shaping resource 245. The destination NPU 240 may utilize the information from header 540 to associate, to packet 520, a destination shaping resource 245 that matches the bandwidth associated with packet 520 and/or the source virtual machine 234. In some implementations, the destination shaping resource 245 may utilize the information from header 540 to provide packet 520 to the destination virtual machine 234. For example, the destination shaping resource 245 may utilize the VLAN ID of the destination VM in order to provide packet 520 to the destination virtual machine 234. The destination virtual machine 234 may receive packet 520, and may process packet 520 based on information provided in or requested by packet 520.

As indicated above, FIGS. 5A-5C are provided merely as an example. Other examples are possible and may differ from what was described with regard to FIGS. 5A-5C. In some implementations, the various operations described in connection with FIGS. 5A-5C may be performed automatically or at the request of the user.

FIG. 6 is a flow chart of an example process 600 for receiving a packet with a header that informs a destination NPU about source shaping resource information and source VM information. In some implementations, process 600 may be performed by a destination NPU 240. In some implementations, process 600 may be performed by another device or a group of devices separate from or including the destination NPU 240.

As shown in FIG. 6, process 600 may include receiving a packet with a header that identifies an address of a source virtual machine (VM), an identifier (ID) of a source shaping resource, and a bandwidth of the source VM (block 610). For example, user device 210 may provide a packet to a source virtual machine 234 (e.g., of a source computing resource 230) or may cause the source virtual machine 234 to generate a packet based on the interactions between user device 210 and the source virtual machine 234. The source computing resource 230 may provide the packet to a source NPU 240. The source NPU 240 may associate a source shaping resource 245 with the packet, and may add a header to the packet. In some implementations, the header may identify an address (e.g., a MAC address) associated with the source virtual machine 234, an identifier associated with the source shaping resource 245, a bandwidth of the source virtual machine 234, and/or other information (e.g., a MAC address of a destination computing resource 230, a VLAN identifier of the source virtual machine 234, a VLAN identifier of a destination virtual machine 234, etc.).

In some implementations, the source NPU 240 (e.g., via the source shaping resource 245) may provide the packet, with the added header, to a network device of cloud computing environment 220, such as a destination NPU 240. In some implementations, the source NPU 240 may cause the packet and the header to be forwarded through cloud computing environment 220 until the packet and the header arrive at the destination NPU 240. The destination NPU 240 may receive the packet and the header.

As further shown in FIG. 6, process 600 may induct wing the header from the packet (block 620). For example, the destination NPU 240 may remove the header from the packet, and may read the information provided in the header. In some implementations, the destination NPU 240 may utilize the information provided in the header to forward the packet to an appropriate destination (e.g., a destination virtual machine 234). In some implementations, the packet and the header may not include destination information (e.g., if the packet is a broadcast packet). In such implementations, the destination NPU 240 may forward the packet to an available destination computing resource 230 with an available destination virtual machine 234.

As further shown in FIG. 6, process 600 may include storing the address of the source VM, the ID of the source shaping resource, and the bandwidth of the source VM in a data structure (block 630). For example, the destination NPU 240 may store the header information (e.g., the MAC address of the source virtual machine 234, the identifier of the source shaping resource 245, the bandwidth of the source virtual machine 234, and/or the other information) in a data structure (e.g., a table, a database, a list, etc.) associated with the destination NPU 240. In some implementations, the destination NPU 240 may utilize the header information if return traffic, in response to the packet, is to be provided to the source virtual machine 234. For example, the destination NPU 240 may utilize the MAC address of the source virtual machine 234 and the identifier of the source shaping resource 245 to route the return traffic to the source virtual machine 234 via the source shaping resource 245. The destination NPU 240 may utilize the bandwidth of the source virtual machine 234 to ensure that the return traffic is forwarded at a bandwidth that does not exceed the bandwidth of the source virtual machine 234.

In some implementations, the data structure may include a table with a MAC address of a source VM field, a shaping resource ID field, a bandwidth of a source VM field, and an other information field. The MAC address of a source VM field may include one or more entries for MAC addresses of the source virtual machines 234 that are learned from packets received by the destination NPU 240. The shaping resource ID field may include one or more entries for identifiers of the source shaping resources 245 that are learned from packets received by the destination NPU 240. The bandwidth of source VM field may include one or more entries for bandwidths of the source virtual machines 234 that are learned from packets received by the destination NPU 240. The other information field may include one or more entries for other information (e.g., MAC addresses of the destination computing resources 230, VLAN identifiers of the source virtual machines 234, VLAN identifiers of the destination virtual machines 234, etc.) that is learned from packets received by the destination NPU 240.

In some implementations, if the source virtual machine 234 changes tenancy information (e.g., an identifier of the source NPU 240, path information, etc.) and/or bandwidth information (e.g., a change in QoS properties required of the destination shaping resource 245), the destination NPU 240 may detect the changes and may update the data structure associated with the destination NPU 240 based on the changes.

As further shown in FIG. 6, process 600 may include associating a destination shaping resource with the packet (block 640). For example, the destination NPU 240 may associate a destination shaping resource 245 with the packet based on the header information. In some implementations, the destination NPU 240 may determine, from the header information, the bandwidth of the source virtual machine 234 and/or the identifier of the source shaping resource 245. In such implementations, the destination NPU 240 may associate the destination shaping resource 245 with the packet based on the bandwidth of the source virtual machine 234 and/or the bandwidth of the source shaping resource 245. For example, the destination shaping resource 245 may include a bandwidth that matches the bandwidth of the source virtual machine 234 and/or the bandwidth of the source shaping resource 245.

In some implementations, the packet may include information identifying a particular bandwidth (e.g., in Mbps, Gbps, etc.) at which to transmit the packet. In some implementations, when a packet arrives at the destination NPU 240, the destination NPU 240 may determine the particular bandwidth associated with the packet, and may associate the destination shaping resource 245 with the packet based on the particular bandwidth. The destination shaping resource 245 may include a bandwidth that matches or exceeds the particular bandwidth associated with the packet.

As further shown in FIG. 6, process 600 may include forwarding the packet, via the destination shaping resource, to a destination VM on a destination cloud computing resource (CR) (block 650). For example, the destination NPU 240 may forward the packet, via the destination shaping resource 245, to a destination virtual machine 234 provided on a destination computing resource 230. In some implementations, the destination NPU 240 may utilize the address associated with the destination computing resource 230 to forward the packet through cloud computing environment 220. For example, if the destination NPU 240 is connected to the destination computing resource 230, the destination NPU 240 (e.g., via the destination shaping resource 245) may utilize the address to forward the packet to the destination computing resource 230. If the destination NPU 240 is not connected to the destination computing resource 230, the destination NPU 240 may utilize the address to forward the packet to a next hop network device (e.g., closer to the destination computing resource 230). The destination computing resource 230 may receive the packet, and may provide the packet to the destination virtual machine 234.

In some implementations, if the packet header does not include the address of the destination computing resource 230 and the VLAN identifier of the destination virtual machine 234, the destination NPU 240 may provide the packet to an available destination computing resource 230 with an available destination virtual machine 234. In such implementations, the destination NPU 240 may utilize the destination shaping resource 245 to provide the packet to the available destination computing resource 230, and the available computing resource 230 may provide the packet to the available destination virtual machine 234.

In some implementations, if the destination NPU 240 identifies the destination virtual machine 234, the destination NPU 240 may also identify the destination shaping resource 245 that corresponds to a packet destination. The destination shaping resource 245 may be utilized to control a bandwidth of data delivery to the packet destination (e.g., the destination virtual machine 234). In some implementations, if the destination NPU 240 fails to identify the destination virtual machine 234, the destination NPU 240 may broadcast the packet via a generic destination shaping resource 245 that controls a bandwidth utilized by the broadcast of the packet (e.g., and to discover the destination virtual machine 234) or may utilize hardware capacity to broadcast the packet.

As further shown in FIG. 6, process 600 may include receiving a return packet from the destination VM based on the packet (block 660). For example, the destination virtual machine 234 may receive the packet, and may generate a return packet in response to the packet. The destination virtual machine 234 may provide the return packet to the destination NPU 240, and the destination NPU 240 may receive the return packet. In some implementations, the destination virtual machine 234 may process the packet based on information contained in the packet. In some implementations, the packet may request that the destination virtual machine 234 perform a particular function and return results (e.g., the return packet) based on performance of the particular function. The destination virtual machine 234 may perform the particular function to generate the return packet, and may provide the return packet to the destination NPU 240.

As further shown in FIG. 6, process 600 may include adding, to the return packet, a return header that identifies an address of the destination VM, an ID of the destination shaping resource, and a bandwidth of the destination VM (block 670). For example, the destination NPU 240 may add a return header to the return packet. In some implementations, the return header may identify an address (e.g., a MAC address) associated with the destination virtual machine 234, an identifier associated with the destination shaping resource 245, a bandwidth associated with the destination virtual machine 234, and/or other information (e.g., a MAC address of the source computing resource 230, a VLAN identifier of the source virtual machine 234, a VLAN identifier of the destination virtual machine 234, an identifier of the destination NPU 240, etc.). In some implementations, the information included in the return header may be utilized by the source NPU 240 to associate the shaping resource 245 with the return packet (e.g., that was associated to the packet), and to learn about the bandwidth associated with the destination virtual machine 234.

In some implementations, the destination NPU 240 may retrieve, from the data structure, information associated with the header, and may provide the retrieved information in the return header. For example, the destination NPU 240 may retrieve the MAC address of the source virtual machine 234 and the identifier of the source shaping resource 245 from the data structure, and may provide the MAC address of the source virtual machine 234 and the identifier of the source shaping resource 245 in the return header.

As further shown in FIG. 6, process 600 may include providing the return packet with the return leader to a network device for transmission to the source VM (block 680). For example, the destination NPU 240 (e.g., via the destination shaping resource 245) may provide the return packet, with the return header, to the source NPU 240. The source NPU 240 may remove or strip the return header from the return packet, and may store the information of the return header in another data structure. The source NPU 240 may utilize the same source shaping resource 245 utilized to transmit the packet for transmitting the return packet. In some implementations, the source shaping resource 245 may include a bandwidth that matches the bandwidth of the source virtual machine 234. In some implementations, the source NPU 240 may configure the bandwidth of the source shaping resource 245 to match the bandwidth of the source virtual machine 234.

In some implementations, the source NPU 240 may utilize the address associated with the source computing resource 230 to forward the return packet through cloud computing environment 220. For example, if the source NPU 240 is connected to the source computing resource 230, the source NPU 240 (e.g., via the source shaping resource 245) may utilize the address to forward the return packet to the source computing resource 230. If the source NPU 240 is not connected to the source computing resource 230, the source NPU 240 may utilize the address to forward the return packet to a next hop network device (e.g., closer to the source computing resource 230). The source computing resource 230 may receive the packet, and may provide the packet to the source virtual machine 234.

In some implementations, there may be multiple source virtual machines 234 and/or source NPUs 240 in cloud computing environment 220 that wish to simultaneously communicate with the same destination virtual machine 234. For example, two 100 Mbps source virtual machines 234 (e.g., with 100 Mbps bandwidth) may be wish to provide data to a destination virtual machine 234 (e.g., with a 100 Mbps bandwidth). The source virtual machines 234, and corresponding source NPUs 240, may be unaware of each other. A destination shaping resource 245, associated with a destination NPU 240 and the destination virtual machine 234, may receive data at twice the bandwidth than may be received by the destination virtual machine 234. The destination shaping resource 245 may inform the destination NPU 240 about the overload condition, and the destination NPU 240 inform other NPUs 240 in cloud computing environment 220 about of the overload condition. In some implementations, the destination NPU 240 may use database information to identify source NPUs 240 that need to be informed about the overload condition. In such implementations, the destination NPU 240 may inform the identified source NPUs 240 about the overload condition rather than flood devices of cloud computing environment 220 with such information, which may reduce costs and increase scalability.

In some implementations, information associated with the overload condition may include numeric information indicating a degree of congestion and/or adjustment indicators to be applied by source shaping resources 245 associated with the source virtual machine 234. The information associated with the overload condition may also include an identifier of the destination NPU 240 and an identifier of the destination shaping resource 245 at the destination NPU 240. Source NPUs 240 receiving the information associated with the overload condition may use the identifiers of the destination NPU 240 and the destination shaping resource 245 to identify source shaping resources 245 need to be updated. The source NPUs 240 may utilize database information to identify the source shaping resources 245, and may utilize the information about the overload condition to instruct the source shaping resources 245 to adjust queuing and bandwidth emission allowances.

In some implementations, NPUs 240 may logically extend MAC learning to incorporate learning, location, speeds, and other QoS properties associated with virtual machines 234. Each NPU 240 may identify a list of other NPUs 240 for congestion updates, and, if a congestion update is needed, may limit bandwidth utilized by service information in the congestion update. NPUs 240 may dynamically create and maintain relationships between QoS of source and destination virtual machines 234, on an as needed basis, which may provide a scalable cloud computing environment 220 with QoS in a smaller cloud hardware footprint.

In some implementations, source shaping resources 245 may shape and manage queues from source NPUs 240 to source virtual machines 234, and may be provisioned into source NPUs 240 when source virtual machine 234 tenancy is established. In some implementations, destination shaping resources 245 may shape and manage queues from source NPUs to destination virtual machines 234, and may mirror QoS properties and state of destination virtual machines 234 and/or destination NPUs 240. In such implementations, QoS may be applied as early as possible along a data path between a source virtual machine 234 and a destination virtual machine 234.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example 700 relating to example process 600 shown in FIG. 6. In example 700, assume that the source NPU 240 packet 520 and header 540 to the destination NPU 240, and that the destination NPU 240 receives packet 520 and header 540, as indicated by reference number 710 in FIG. 7A. As further shown in FIG. 7A, the destination NPU 240 may strip or remove header 540 from packet 520, as indicated by reference number 720, and may store header information 730 in a data structure 740. Header information 730 may include the information provided in header 540, such as a MAC address of the source virtual machine 234 (e.g., "22:41:57:82:94:cd"), an identifier of the source shaping resource 245 (e.g., "3"), a bandwidth of the source virtual machine 234 (e.g., "10 Gbps"), and/or other information (e.g., a MAC address of the destination computing resource 230, a VLAN ID of the source virtual machine 234, a VLAN ID of the destination virtual machine 234, etc.).

Data structure 740 may include a table with a MAC address of a source VM field, a shaping resource ID field, a bandwidth of a source VM field, and an other information field. The MAC address of a source VM field may include one or more entries for MAC addresses of the source virtual machines 234 (e.g., "22:41:57:82:94:cd") that are learned from packets received by the destination NPU 240. The shaping resource ID field may include one or more entries for identifiers of the source shaping resources 245 (e.g., "3") that are learned from packets received by the destination NPU 240. The bandwidth of source VM field may include one or more entries for bandwidths of the source virtual machines 234 (e.g., "10 Gbps") that are learned from packets received by the destination NPU 240. The other information field may include one or more entries for other information (e.g., MAC addresses of the destination computing resources 230, VLAN identifiers of the source virtual machines 234, VLAN identifiers of the destination virtual machines 234, etc.) that is learned from packets received by the destination NPU 240.

The destination NPU 240 may utilize header information 730 to forward packet 520. For example, the destination NPU 240 may utilize the VLAN ID of the destination virtual machine 234 in order to forward packet 520 to the destination virtual machine 234, as indicated by reference number 750 in FIG. 7B. The destination virtual machine 234 may receive packet 520, and may process packet 520, by performing a function, service, etc. requested by packet 520. For example, assume that packet 520 requested the destination virtual machine 234 to perform a calculation, and that the destination virtual machine 234 performs the requested calculation to generate a result. Processing packet 520 may cause the destination virtual machine 234 to generate a return packet 760 in response to packet 520. For example, return packet 760 may include the result generated from performance of the calculation requested by packet 520.

Return packet 760 may include a frame, a datagram, a packet, or a cell; a fragment of a frame, a fragment of a datagram, a fragment of a packet, or a fragment of a cell; or another type, arrangement, or packaging of data. In some implementations, return packet 760 may include an IP over Ethernet frame. Return packet 760 may be destined for the source virtual machine 234 of the source computing resource 230, and the destination computing resource 230 may provide return packet 760 to the destination NPU 240, as further shown in FIG. 7B. Return packet 760 may include information that instructs the destination NPU 240 to forward return packet 760 to the source virtual machine 234. The destination NPU 240 may associate the destination shaping resource 245 for transmitting return packet 760 since the destination shaping resource 245 handled packet 520. As further shown in FIG. 7B, the destination NPU 240 may utilize information provided in data structure 740 (e.g., about the source virtual machine 234 and/or the source shaping resource 245) to add a return header to return packet 760, as described below.

Figure 7A:
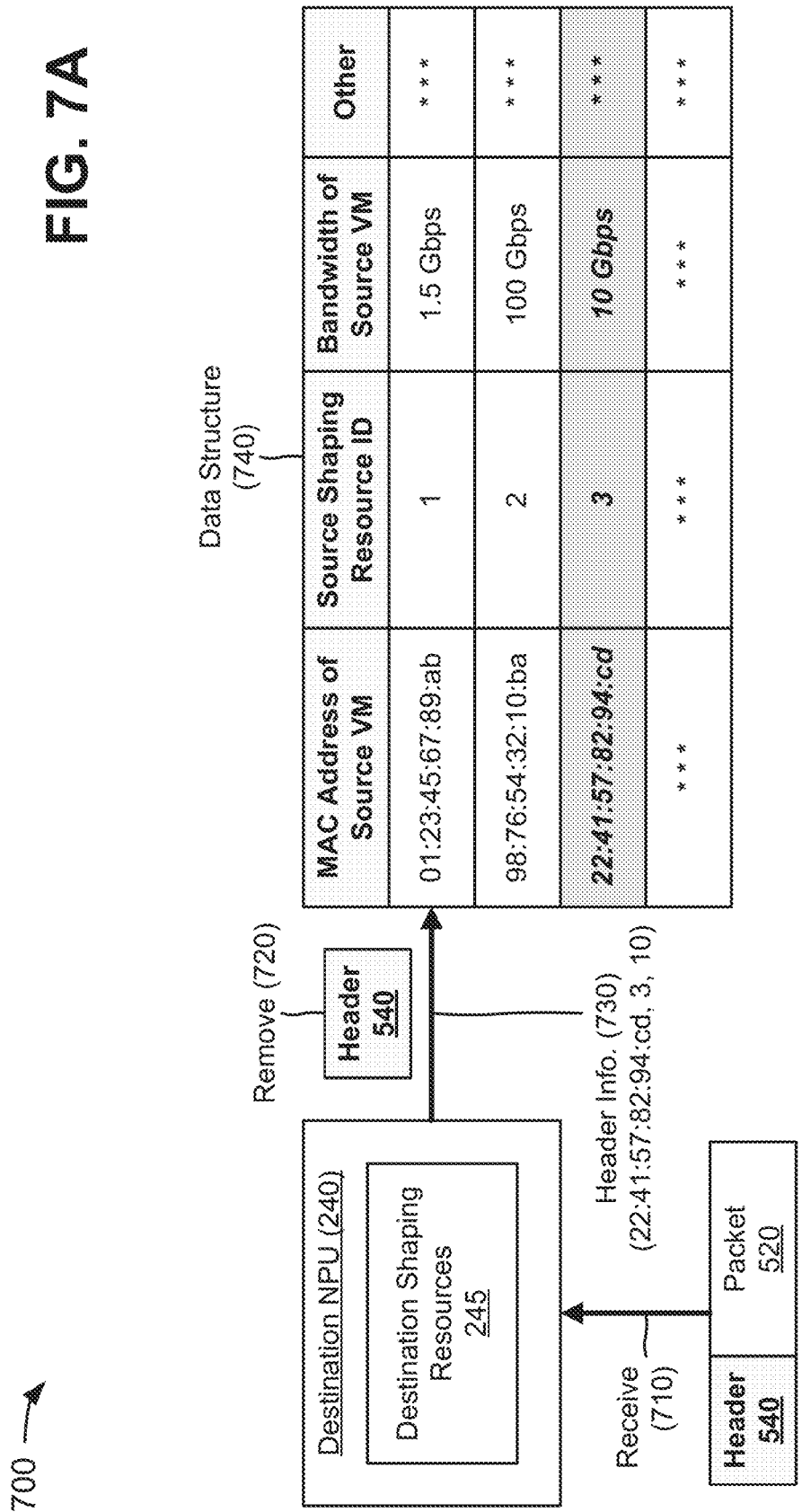
FIGS. 7A-7D are diagrams of an example relating to the example process shown in FIG. 6.
Figure 7B:
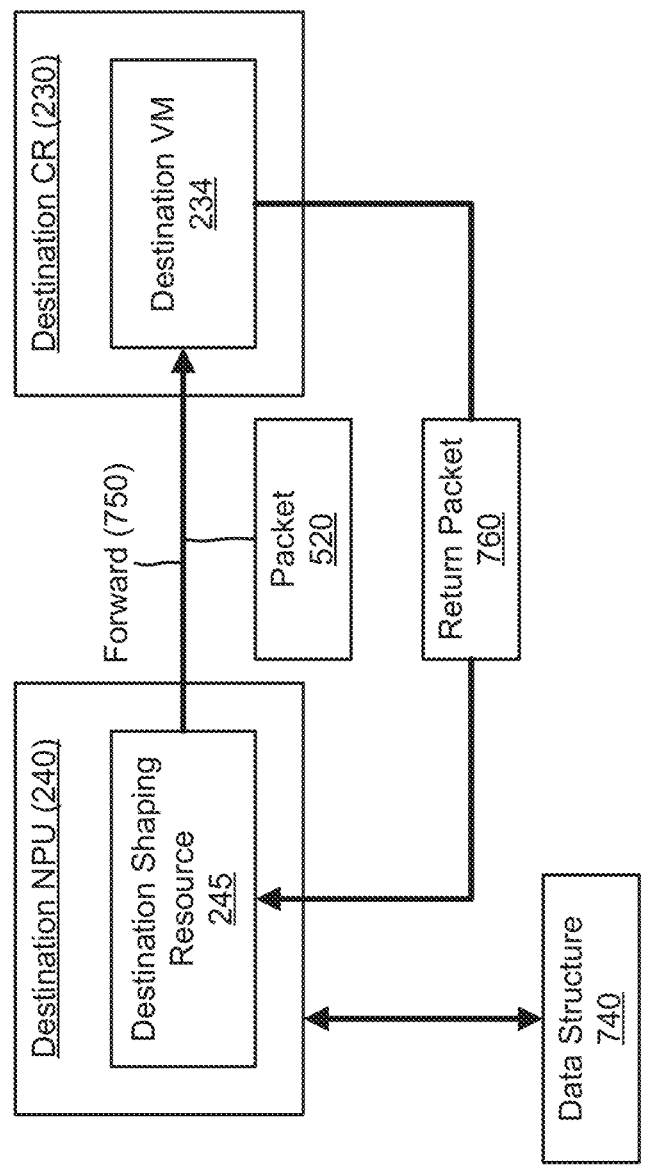
Figure 7C:
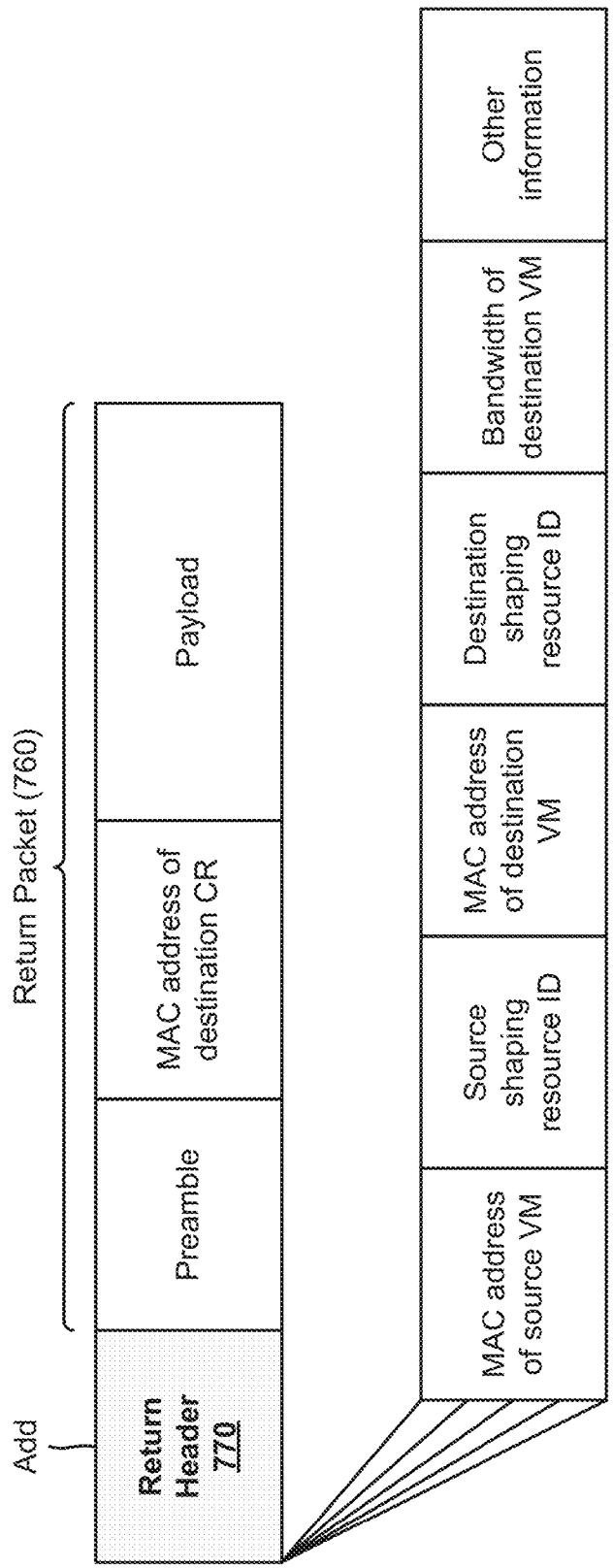

As shown in FIG. 7C, return packet 760 may include a variety of fields, such as, for example, a preamble, a MAC address of the destination CR, a payload, etc. The preamble may include a synchronization pattern that is used to establish synchronization. After synchronization is established, the preamble may be used to locate a first bit of return packet 760. The MAC address of the destination CR may include a MAC address of the destination computing resource 230. The payload may include user data (e.g., the result generated from performance of the calculation) to be delivered to the source virtual machine 234.

As further shown in FIG. 7C, the destination NPU 240 may add a return header 770 to return packet 760. Return header 770 may include a variety of fields, such as, for example, a MAC address of the source VM field, a source shaping resource ID field, a MAC address of the destination VM field, a destination shaping resource ID field, a bandwidth of the destination VM, and/or other information (e.g., a MAC address of the destination CR, a VLAN ID of the destination VM, a VLAN ID of the source VM, etc.). The MAC address of the source VM field may include a MAC address of the source virtual machine 234. The source shaping resource ID field may include an identifier of the source shaping resource 245. The MAC address of the destination VM field may include a MAC address of the destination virtual machine 234. The destination shaping resource ID field may include an identifier of the destination shaping resource 245. The bandwidth of the destination VM field may include a bandwidth of the destination virtual machine 234. The MAC address of the destination CR may include a MAC address of the destination computing resource 230. The VLAN ID of the destination VM may include a VLAN tag of the destination virtual machine 234. The VLAN ID of the source VM may include a VLAN tag of the source virtual machine 234.

Figure 7D:
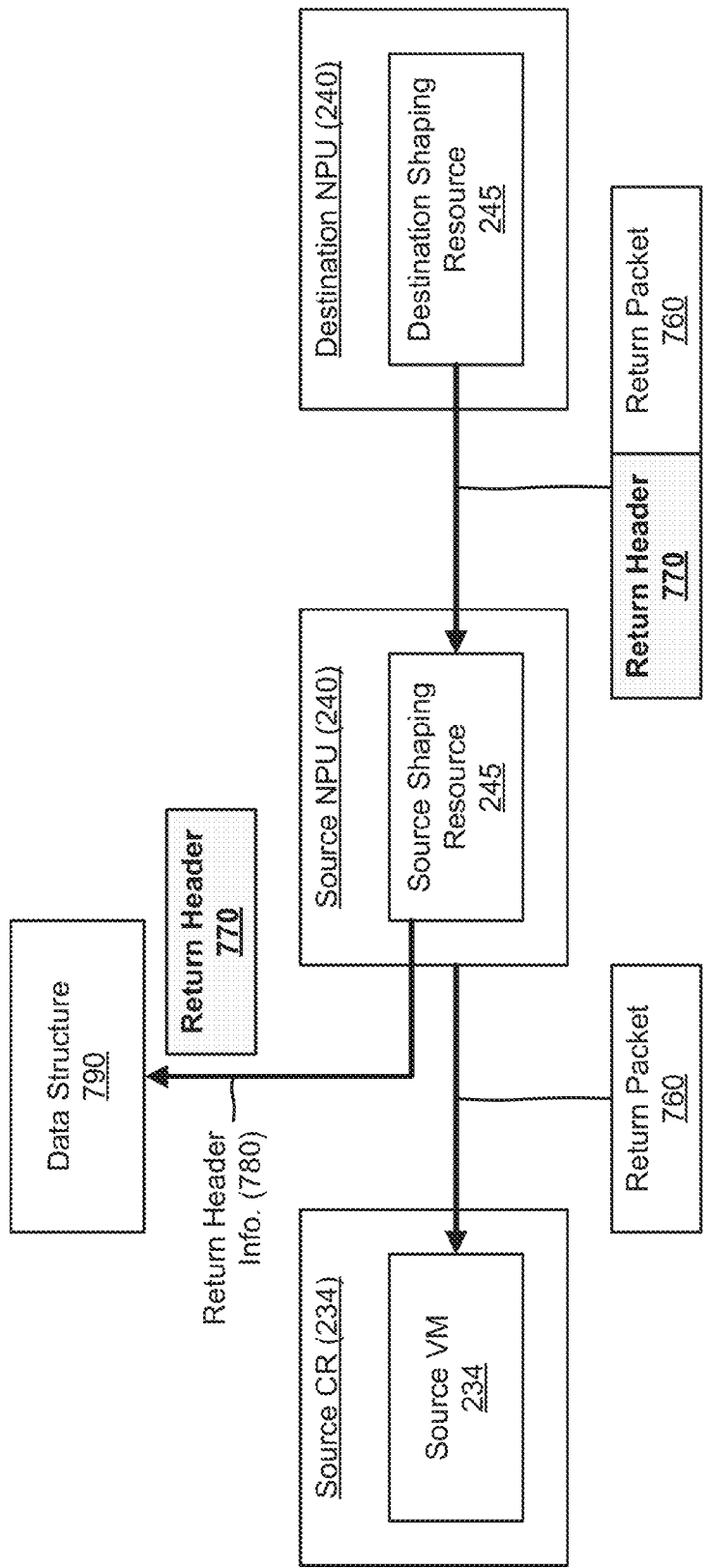

As shown in FIG. 7D, the destination shaping resource 245 of the destination NPU 240 may provide return packet 760 and return header 770 to the source NPU 240. The source NPU 240 may strip return header 770 from return packet 760, and may store information 780 from return header 770 in a data structure 790 (e.g., a table, a database, etc.) so that the source NPU 240 may learn information about the destination virtual machine 234 and the destination shaping resource 245. The source NPU 240 may utilize return header information 780 (e.g., the identifier of the source shaping resource 245) to associate, to return packet 760, the source shaping resource 245 that handled packet 520. In some implementations, the source shaping resource 245 may utilize return header information 780 to provide return packet 760 to the source virtual machine 234. For example, the source shaping resource 245 may utilize the VLAN ID of the source VM in order to provide return packet 760 to the source virtual machine 234. The source virtual machine 234 may receive return packet 760, and may process return packet 760 based on information provided in or requested by return packet 760. For example, the source virtual machine 234 may receive the result generated from performance of the calculation requested by packet 520.

As indicated above, FIGS. 7A-7D are provided merely as an example. Other examples are possible and may differ from what was described with regard to FIGS. 7A-7D. In some implementations, the various operations described in connection with FIGS. 7A-7D may be performed automatically or at the request of the user.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the term "having" is intended to be an open-ended term. Further, the phrase "based on" is intended to mean "based, at least in part, on" unless explicitly stated otherwise.

What is claimed is:
1. A method, comprising:
receiving, by a source network device of a cloud computing network, a packet destined for a destination virtual machine provided in a destination cloud computing device,
the packet being received from a source virtual machine provided in a source cloud computing device;
associating, by the source network device and with the packet, a source shaping resource of the source network device,
the source shaping resource including a bandwidth that matches or exceeds a bandwidth associated with the source virtual machine;

adding, by the source network device and to the packet, a header that identifies:
an address of the source virtual machine,
an identifier associated with the source shaping resource, and the bandwidth associated with the source virtual machine; and
providing, by the source network device and via the source shaping resource, the packet and the header to the cloud computing network for transmission to the destination virtual machine.

2. The method of claim 1, where the header further identifies at least one of:
an address of the destination cloud computing device,
a virtual local area network (VLAN) identifier of the source virtual machine, or
a VLAN identifier of the destination virtual machine.

3. The method of claim 2, further comprising:
providing the packet and the header to a destination network device of the cloud computing network,
the address of the destination cloud computing device permitting the destination network device to forward the packet and the header to the destination cloud computing device.

4. The method of claim 1, further comprising:
providing the packet and the header to a destination network device of the cloud computing network,
the destination network device forwarding the packet and the header to an available destination virtual machine that includes a bandwidth that matches or exceeds the bandwidth associated with the source virtual machine.

5. The method of claim 1, where the packet is one of:
generated by the source virtual machine, or
received by the source virtual machine from a user device.

6. The method of claim 1, where the packet includes an Internet protocol (IP) over Ethernet packet.

7. A first network device, comprising:
a memory storing instructions; and
one or more processors, at least partially implemented in hardware, to execute the instructions to:
receive a packet destined for a first virtual machine provided in a first cloud computing device of a cloud computing network,
the packet being received from a second virtual machine provided in a second cloud computing device,
associate, to the packet, a shaping resource of the first network device,
the shaping resource including a bandwidth that matches or exceeds a bandwidth associated with the second virtual machine,
add, to the packet, a header that identifies:
an address of the second virtual machine,
an identifier associated with the shaping resource, and
the bandwidth associated with the second virtual machine, and
provide, via the shaping resource, the packet and the header to the cloud computing network for transmission to the first virtual machine.

8. The first network device of claim 7, where the header further identifies at least one of:
an address of the first cloud computing device,
a virtual local area network (VLAN) identifier of the second virtual machine, or
a VLAN identifier of the first virtual machine.

9. The first network device of claim 8, where the one or more processors are further to:
provide the packet and the header to a second network device of the cloud computing network,
the address of the first cloud computing device permitting the second network device to forward the packet and the header to the first cloud computing device.

10. The first network device of claim 7, where the one or more processors are further to:
provide the packet and the header to a second network device of the cloud computing network,
the second network device forwarding the packet and the header to an available virtual machine that includes a bandwidth that matches or exceeds the bandwidth associated with the second virtual machine.

11. The first network device of claim 7, where the one or more processors are further to:
select the shaping resource from a plurality of shaping resources.

12. The first network device of claim 7, where the one or more processors are further to:
store, in a data structure, the address of the second virtual machine, the identifier associated with the shaping resource, and the bandwidth associated with the second virtual machine.

13. A method, comprising:
receiving, by a destination network device of a cloud computing network, a packet with a header,
the packet being provided by a source virtual machine provided in a source cloud computing device,
the packet being received from a source shaping resource of a source network device of the cloud computing network, and
the header identifying:
an address of the source virtual machine,
an identifier associated with the source shaping resource, and
a bandwidth associated with the source virtual machine;
removing, by the destination network device, the header from the packet;
storing, by the destination network device, the address of the source virtual machine, the identifier associated with the source shaping resource, and the bandwidth associated with the source virtual machine in a data structure;
associating, by the destination network device and with the packet, a destination shaping resource of the destination network device,
the destination shaping resource including a bandwidth that matches or exceeds the bandwidth associated with the source virtual machine; and
forwarding, by the destination network device and via the destination shaping resource, the packet to a destination virtual machine provided in a destination cloud computing device.

14. The method of claim 13, further comprising:
receiving a return packet from the destination virtual machine based on the packet; and
adding, to the return packet, a return header that identifies:
the address of the source virtual machine,
the identifier associated with the source shaping resource,
an address of the destination virtual machine,
an identifier associated with the destination shaping resource, and a bandwidth associated with the destination virtual machine.

15. The method of claim 14, further comprising:
providing the return packet and the return header to the source shaping resource based on the identifier associated with the source shaping resource,
the source shaping resource providing the return packet to the source virtual machine based on the address of the source virtual machine.

16. The method of claim 14, further comprising:
storing, in another data structure, at least one of:
the address of the destination virtual machine,
the identifier associated with the destination shaping resource, or
the bandwidth associated with the destination virtual machine.

17. A first network device, comprising:
a memory storing instructions; and
one or more processors, at least partially implemented in hardware, to execute the instructions to:
receive a packet with a header;
the packet being provided by a first virtual machine provided in a first cloud computing device,
the packet being received from a shaping resource of a second network device of a cloud computing network, and
the header identifying:
an address of the first virtual machine,
an identifier associated with the shaping resource, and
a bandwidth associated with the first virtual machine,
remove the header from the packet;
store the address of the first virtual machine, the identifier associated with the shaping resource, and the bandwidth associated with the first virtual machine in a data structure;
associate, to the packet, another shaping resource of the first network device,
the other shaping resource including a bandwidth that matches or exceeds the bandwidth associated with the first virtual machine; and
forward, via the other shaping resource, the packet to a second virtual machine provided in a second cloud computing device.

18. The first network device of claim 17, where the one or more processors are further to:
receive a return packet from the second virtual machine based on the packet; and
add, to the return packet, a return header that identifies:
the address of the first virtual machine,
the identifier associated with the shaping resource,
an address of the second virtual machine,
an identifier associated with the other shaping resource, and
a bandwidth associated with the second virtual machine.

19. The first network device of claim 18, where the one or more processors are further to:
provide the return packet and the return header to the shaping resource based on the identifier associated with the shaping resource,
the shaping resource providing the return packet to the first virtual machine based on the address of the first virtual machine.

20. The first network device of claim 18, where the return packet includes an Internet protocol (IP) over Ethernet packet.

* * * * *